United States Patent [19]

Kober et al.

[11] Patent Number: 4,707,911

[45] Date of Patent: Nov. 24, 1987

[54] POROUS ELECTRODES AND METHOD OF MAKING SAME

[75] Inventors: Frederick P. Kober, New York, N.Y.; Oscar V. Montefusco, Stillwater, Pa.

[73] Assignee: PolyCrystal Technologies Corp., New York, N.Y.

[21] Appl. No.: 3,090

[22] Filed: Jan. 14, 1987

Related U.S. Application Data

[62] Division of Ser. No. 760,673, Jul. 30, 1985, abandoned.

[51] Int. Cl.$^4$ ............................................. H01M 4/18
[52] U.S. Cl. ................................. 29/623.5; 204/2.1; 419/2; 75/20 F; 429/228
[58] Field of Search ................... 29/623.5; 204/2.1; 419/2; 429/225, 227, 228; 75/20 F

[56] References Cited

U.S. PATENT DOCUMENTS

| | | | |
|---|---|---|---|
| 440,267 | 11/1890 | Payen | 204/2.1 |
| 1,919,730 | 7/1933 | Koening et al. | 419/2 |
| 2,969,414 | 1/1961 | Fleischer | 204/2.1 |
| 3,802,878 | 4/1974 | Lindstrom | 419/2 |
| 3,929,505 | 12/1975 | Burkett et al. | 204/2.1 |
| 4,131,515 | 12/1978 | Ruben | 204/2.1 |
| 4,251,603 | 2/1981 | Matsumoto et al. | 428/613 X |

OTHER PUBLICATIONS

Vinal, Storage Batteries, John Wiley and Sons, Inc., Third Edition, 1940, pp. 40–41.

Primary Examiner—Anthony Skapars

[57] ABSTRACT

Porous electrodes are provided for lead-acid storage batteries without supporting plates or grids. The electrodes are porous, self-supporting, structurally integral and electrically continuous. Lead-acid batteries incorporating such electrodes exhibit improved performance characteristics as compared to conventional lead-acid batteries. The electrodes are made by forming a molten mixture of a metal (e.g. lead) and a pore forming component (e.g. cadmium), cooling and forming the molten mixture into a solid electrode with the pore forming component distributed therethrough, removing the pore forming component from the solid electrode to leave a network of voids defining the pores, and oxidizing the metallic walls within the pores to form a coating of electrochemically active material (e.g., lead dioxide) on the walls within the pores.

26 Claims, 2 Drawing Figures

POROUS ELECTRODES AND METHOD OF MAKING SAME

This is a division, of application Ser. No. 760,673 filed July 30, 1985 now abandoned.

FIELD OF THE INVENTION

This invention relates generally to electrodes for batteries and is particularly related to a self-supporting porous electrod for use in secondary storage cells and secondary storage batteries. In one particular aspect, the invention is directed to an improved, self-supporting porous electrode for use in secondary storage batteries of the lead-acid type.

The present invention is also concerned with a method of making such self-supporting porous electrodes.

BACKGROUND OF THE INVENTION

Battery technology dates back at least as early as 1800 and the discovery of the galvanic cell. Since then, numerous investigators have conducted extensive research and experiments in the field of electrochemistry, or battery chemistry, for developing suitable electrodes for different types of batteries. Indeed, most modern-day battery electrodes constitute considerable advance over the electrodes developed by G. Planté in 1859 and batteries employing the modern-day electrodes exhibit decided advantages and improved performance characteristics as compared to the early batteries.

While secondary lead-acid storage batteries have been considerably improved over the years, they still suffer from several significant limitations, especially when the battery is subjected to severe charge-discharge cycling as is often the case in practical use. By severe charge-discharge cycling is meant that the battery is subjected to repeated deep discharges approaching 100 percent of its rated capacity, at high discharge rates, i.e., at discharge rates exceeding the four hour rate (C/4). In order to efficiently recharge conventional lead-acid storage batteries, with little or no deterioration thereto, the charging current must be low as compared to the rated capacity of the battery. Charging at such low currents, however, requires as long as about 8 hours or more to fully charge conventional batteries. Even under the most carefully controlled charge-discharge conditions, the useful life of the present day lead-acid secondary storage battery is limited to several hundred cycles at best, at moderate rates.

The aforementioned and other limitations inherent in the conventional lead-acid type battery is basically due to the types of electrodes which are used in such batteries, primarily the positive electrode, and to a lesser degree the negative electrode. Conventional state-of-the-art lead acid battery electrodes, both positive and negative, are usually made by depositing a layer of electrochemically active material such as, for example, lead oxide on a carrier plate or a grid structure. Because of the highly corrosive nature of the electrolyte (sulfuric acid) in the lead-acid storage battery, the electrode, especially the positive electrode, slowly corrodes and its surface is oxidized thus forming an electron barrier between the carrier plate and the active material thereon. The formation of such barrier limits the current at which the battery can be charged or discharged. As the grid corrodes (is oxidized) further with increased use and life of the battery, the charge and discharge current rates become even more limited and, therefore, the overall efficiency of the battery drops significantly. Eventually, if the battery is used under such conditions, the corrosion of the positive plate and the build up of the barrier become so significant that the battery can no longer be fully charged or discharged under any conditions.

Corrosion of the carrier plate also impairs the mechanical integrity of the electrode structure and can ultimately cause cracking or breaking of the electrode. In addition, even at the early stages of corrosion of the carrier plate, the active material is "shed", especially from the positive electrode, a phenomenon commonly referred to as sulfation. This shedding or sulfation of the electrochemically active material from the electrode is irreversible and the battery will therefore continuously lose its capacity irreversibly as a function of its life.

Since the lead-acid storage battery is often subjected to rather rugged conditions, the carrier plates used in these batteries must be sufficiently strong and heavy to exhibit the necessary mechanical strength. Accordingly, the carrier plates significantly add to the weight of the battery without contributing to its capacity (ampere-hours). In addition, this increased weight generally reduces the realizable energy density (watt-hour per pound or watt-hour per cubic inch) of the battery.

During more than a century since the development of the Planté plates, many investigators have conducted numerous experiments resulting in a plethora of patents and publications directed to improvements in electrodes, or methods of their manufacture, for use in lead-acid storage batteries. Thus, as early as Nov. 19, 1889, Clement Payen was granted a patent for a method of producing a porous crystallized metallic plate for use in lead-acid storage batteries. The Payen method involved subjecting certain metallic salts and a metal to fusion, pouring the fused mass into a mold, chemically reducing the crystallized structure to a metallic state followed by electrolytic action to remove the impurities therefrom.

Another early patent, granted to James Hart Robertson on Sept. 24, 1895, describes a method for making a porous plate or electrode. According to this patent, a metal such as lead is heated to molten condition, to which is then added a granulated or powdered artificial, or natural, porous substance such as pumice-stone, brick-dust, kaolin, coral and the like. The resulting pasty mixture is then kneeded in order to properly incorporate and uniformly disseminate the granular substance throughout the mass, and the mass is then molded, or pressed into a mold of the desired size. The mold is then heated to expand the air cells in the added porous substance, thereby producing air spaces in the molded mass, i.e., an "aerated" molded mass. While the mixture is still in the mold, the mold and the mass therein are subjected to slightly elevated temperatures to obtain a smoother plate and the resulting porous plate is removed from the mold. If the plate is to be used as an electrode in a battery, the Robertson patent discloses that the finished plate may be subjected to such action as may be necessary, e.g., electrolytic action, to produce "active material" through its pore.

The aforementioned patents of Payen and Robertson are but two of numerous patents which relate to improvements in electrode manufacture for use in secondary storage batteries. A more representative list, though by no means exhaustive, includes U.S. Pat. Nos. 415,330; 415,331; 415,348; 415,349; 415,683; 434,458;

440,267; 440,268; 440,269; 440,270; 440,272; 440,273; 440,274; 440, 275; 440,276; 440,277; 538,628; 760,561; 1,749,819; 2,640,864; 2,969,414; 3,113,048; 3,496,020; 3,558,359; 3,582,403; and 3,796,607.

Today, after over 100 years of research and investigations in electrode technology, secondary storage lead-acid batteries still use electrodes made by conventional techniques, and these batteries still suffer from several inherent disadvantages as hereinbefore described. In order to improve the performance characteristics of the lead-acid type batteries, Rudolf R. Hradcovsky and Otto R. Kozak, in their U.S. Pat. No. 4,143,261, issued on Mar. 6, 1979, disclose a positive electrode made of a carrier plate coated with a mixture of polycrystalline and crystalline lead dioxide as the electrolytic active material. Storage batteries incorporating such electrodes exhibit lower internal resistance, improved charge-discharge rates, lower sulphation, higher storage capacity and the ability to draw larger amounts of electric current in a considerably shorter time as compared to conventional state-of-the-art lead-acid batteries.

The present invention contemplates providing a battery having all or most of the improved performance characteristics exhibited by the battery described in the above-mentioned Hradcovsky-Kozak patent without, however, the use of a supporting grid or a carrier plate in making the electrode.

Accordingly, it is an object of the present invention to provide improved electrodes for use in storage cells and batteries.

It is a further object of the present invention to make self-supporting porous electrodes, both negative and positive, for use in secondary storage cells and batteries, particularly those of the lead-acid type.

It is also an object of this invention to provide batteries, particularly storage batteries of the lead-acid type, which have improved performance characteristics by virtue of the incorporation therein of the self-supporting porous electrodes made according to the present invention.

It is another object of this invention to provide a method for making self-supporting porous electrodes, positive and negative, for incorporation into lead-acid type storage cells and batteries.

The foregoing and other objects and features of this invention will be more fully appreciated from the following detailed description of the invention and the accompanying drawings.

Figure 1:
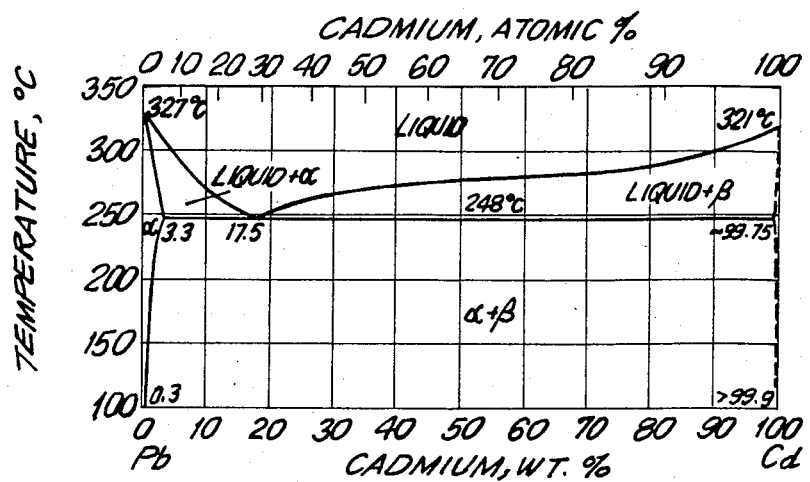
FIG. 1 is a phase diagram for a binary alloy consisting of cadmium (Cd) and lead (Pb)

The significance of these phase diagrams will be appreciated from the ensuing detailed description of the invention.

SUMMARY OF THE INVENTION

A novel and unique porous, self-supporting, structurally integral and electrically continuous electrode is provided for use principally in lead-acid storage cells and lead-acid storage batteries. Since no supporting plates or grids are used in making these electrodes, the resulting batteries are considerably lighter than conventional lead-acid batteries. Moreover, as described in more detail in the ensuing detailed description of the invention, lead-acid storage batteries incorporating these novel electrodes exhibit superior performance characteristics as compared to conventional lead-acid batteries.

The electrodes of the present invention are made by a unique method which, broadly, comprises:

(a) forming a molten mixture of a metal (e.g., lead) and a pore forming component (e.g., cadmium) and relatively uniformly distributing the second component in the molten mixture, (b) cooling the molten mixture and forming (e.g., by casting or molding) the same into a solid electrode having the desired dimensions and configuration, (c) removing said pore forming component from said solid electrode to form a porous electrode having a network of voids distributed relatively uniformly throughout the metal matrix, and (d) treating said porous electrode in an oxidizing environment whereby the walls within the pores are oxidized to form a layer of an electrochemically active material (e.g., lead diox- ide) on the surface of said walls within the pores.

DETAILED DESCRIPTION OF THE INVENTION

In accordance with this invention, there is provided a unique self-supporting porous electrode for use in lead-acid storage batteries, hereinafter also referred to as lead-acid batteries. Since no carrier plate or grid is employed in forming the electrodes of this invention, the resulting electrodes have reduced volume and are significantly lighter in weight as compared to the electrodes used in the state-of-the art lead-acid batteries, without any adverse impact on the structural integrity or mechanical strength of the electrodes.

A further advantage of the porous electrodes of the present invention is that the electrochemically active material is formed in situ within the pores of the electrode and forms an integral part of the metal (usually lead) used to form the electrode structure. Thus, there is both mechanical and electical continuity between the metallic lead surface, which acts both as mechanical support and electron collector, and the active material formed on the surface of the lead within the pores. Accordingly, the active material is always in intimate contact with the lead surface (acting as electron collector) and is totally within the pores as an integral part of the pore walls. This electrode structure minimizes the resistance losses (iR drops) between the active material and the lead surface. Therefore, even if additional surface oxidation occurs, the manifestation of such increased oxidation is the formation of additional active material, resulting in increased battery capacity without loss of electrical continuity. Consequently, lead-acid batteries incorporating such electrodes exhibit remarkably higher rates of discharge and rapid recharge capability compared to conventional lead-acid batteries. Other advantages and improved features of the invention will become more apparent from the following description of the method of forming these electrodes.

In general, in order to form the novel self-supporting porous electrodes of this invention, lead, or a suitable alloy of lead, together with a second component referred to herein as "pore former" or "pore forming" component are heated to form a fluid melt and the fluid melt is thoroughly agitated in order to uniformly disperse the pore former throughout the lead, or lead alloy, as may be the case. For convenience of illustration and description, the invention will be described with reference to lead. Next, the molten mixture is cast into a suitable mold or cavity of the desired configuration and the molten mixture is rapidly cooled in the mold in order to solidify the melt and form the electrode in the desired size and shape. Conventional casting, die casting or molding readily lend themselves to the formation of the solid electrode from the molten mixture.

Alternatively, the molten mixture can be cast into solid billets, the billets rolled to the desired electrode thickness and then stamped to the final electrode shape and size. Any excess material can be remelted and recast to form additional electrodes.

Regardless of the method used to form the solid electrode, the resulting electrode will comprise an integral and continuous metallic lead matrix in which the pore former is relatively uniformly dispersed so as to form a continuous network of voids. Upon removal of the pore former from the metallic lead matrix as hereinafter described, a self-supporting porous electrode will be formed for use in lead-acid batteries having the improved attributes described herein.

The use of the second component (pore former) constitutes an important feature of the present invention and, therefore, the second component must be carefully selected in order to achieve the desired objectives. One significant consideration in choosing the proper second component is that is must exhibit little or no solubility in the metallic matrix. Materials which exhibit a high degree of solubility in, or form intermetallic complexes with, lead, lead alloys or any other metal used to form the electrode, are unsuitable as pore formers and should not be employed as second components.

The second component must also be one which when heated is readily miscible with the metallic matrix and forms a fluid melt therewith which can be easily cast or molded into the desired electrode size and shape.

Another criteria for the selection of the second component is that it must be removable from the metallic matrix in which it is distributed so as to result in the formation of a network of voids in order to form a porous electrode. Several exemplary methods will hereinafter described for the removal of the second component from the metallic matrix.

The second component may itself be matallic but can also be a non-metallic or organic substance. Examples of metallic pore formers include, but are not limited to, cadmium, galluim, thallium, zinc, and mixtures thereof.

The second component may also be any inorganic salt such as an alkali metal carbonate or bicarbonate, for example, sodium carbonate, sodium bicarbonate, potassium carbonate and potassium bicarbonate. Additionally lead carbonate and basic lead carbonate are also suitable pore formers in the practice of this invention. While the aforementioned inorganic salts do not melt in the conventional sense, they do form a fluid melt with lead or lead alloy and can be readily distributed therein. These salts are readily removable from the solid metallic matrix and leave a network of voids therein which define the pores within the final electrode structure.

In addition to the metals and inorganic metal salts heretofore described, certain organic compounds are also useful as pore formers. Such organic compounds include camphor, urea and derivatives of camphor or urea, or any mixture thereof.

The pore former need not be limited to a single component but may be a mixture of any two or more of the aforementioned second components. The choice of the particular second component and its relative amount in the melt depends on the desired pore size and volume distribution in the final electrode. When lead is the metallic matrix and cadmium is the desired pore former, the amount of cadmium used to form the molten mixture can be selected from FIG. 1 of the drawings in this application. This drawing is a phase diagran for cadmium-lead alloy wherein the melting points of Cd-Pb alloy are plotted against the atomic and weight percentages of cadmium in the alloy.

As is illustrated in FIG. 1 (see Lead and Lead Alloys, Properties and Technology, Wilhelm Hofman, Springer-Verlag, New York-Heideberg-Berlin 1970), the solid solubility of cadmium in lead is limited to approximately 8 percent, regardless of the relative compositions of lead and cadmium in the fluid melt. This limited solid solubility of cadmium in lead greatly facilitates the removal of cadmium (pore former) from the lead matrix.

Figure 2:
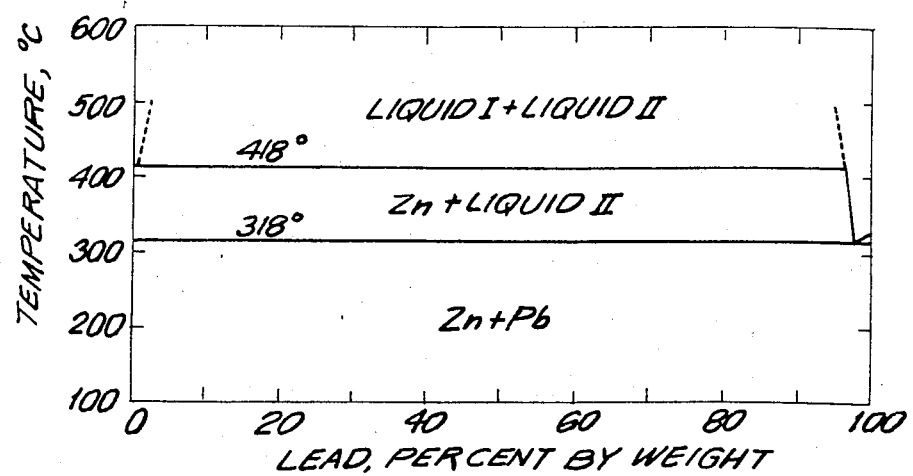
FIG. 2 is a phase diagram for a binary alloy consisting of zinc (Zn) and lead (Pb).

Ideally, the second component (pore former) should exhibit no solid solubility in lead. As shown in FIG. 2 (see Zinc and its Alloys, Circular of The Bureau of Standards, No. 395, issued Nov. 6, 1931 by the U.S. Government Printing Office, Washington, D.C.), zinc approaches the ideal second component and can be used effectively as the pore former in the practice of this invention. Similar phase diagrams are available in various literature and publications for other alloys and may be referred to as guidelines for selecting the amount of the second component for each molten mixture used to form the electrodes of this invention.

In order to maintain the mechanical integrity of the electrode, it must not be excessively porous so as to be incapable of withstanding the rigors of its use in the lead-acid battery. In general, the amount of the second component is selected so that the void volume (pore volumes) constitutes from about 10 to about 50 percent of the electrode. Obviously, the preferred pore volume will depend, to an extent, on the second component, the metallic matrix used to form the electrode, and its requisite mechanical strength.

Although lead and lead alloys (e.g., lead-calcium and lead-antimony alloys) constitute the metallic matrix of choice in the formation of the novel electrodes, other metals and their alloys can be used, provided they form a molten mixture with the second components hereinbefore described and provided further that the resulting electrodes exhibit the requisite mechanical integrity when used in the lead-acid batteries.

From the foregoing description of the invention it can be appreciated that one skilled in the art can readily prepare the desired molten mixture, which is to be cast or molded into an electrode. Thus, having selected the matallic matrix, a suitable pore former may be selected from the above-mentioned list of second components to form a molten mixture for forming the electrode, and which upon the removal of the pore former results in a self-supporting, porous electrode. The resultant electrode is self-supporting in that it has integral structure without a supporting grid or plate as it is now common in making the present day electrodes for lead-acid batteries.

In order to obtain the desired average pore size and pore distribution, the solid (non-porous) electrode formed thus far may be heat treated. Heat treatment causes the second component to nucleate, precipitate or diffuse throughout the metallic matrix and results in different pore size and distribution upon removal of the pore former. Once again it can be appreciated that the exact heat treatment conditions will vary depending upon the matallic matrix, the second component and the ultimate desired pore size and distribution. It is generally desirable that the average pore size in the ultimate electrode structure be within from about 0.1 microns to several hundred microns. It is to be understood therefore that the exact heat treatment conditions and the ultimate pore sizes and distribution are not per se critical in the practice of this invention.

After the solid (non-porous) electrode structure is formed as aforesaid, the second component must be removed therefrom in order to form the desired porous, self-supporting electrode structure. The removal of the second component may be effected by various means such as thermal, chemical, (e.g., by leaching) or electrochemical separation, depending on the nature of the second component. Regardless of which means is used, care must be taken so as not to compromise the mechanical and structural integrity of the metallic matrix. By way of exemplification, when the metallic matrix is lead and the second component is gallium, the second component may be removed thermally, in which case the solid electrode structure is heated to a temperature above about 30° C. At this temperature gallium will melt out of the electrode structure and can be removed mechanically or by decantation. If zinc is the second component, it can be removed by leaching the electrode structure in a suitable leaching agent which leaches out the zinc without affecting the lead matrix. Hydrochloric acid, for example, has been found to be a suitable leaching agent for this purpose. When cadmium is used as the second component, the electrode structure is treated with sufuric acid which leaches the cadmium out of the lead matrix. In order to accelerate the removal of cadmium, the electrode can be made anodic with reference to an external emf source and passing an appropriate current therethrough.

If carbonates or bicarbonates are employed as the second component, they may be removed by leaching in hot water or a suitable acid such as, for example, sulfuric acid.

When an organic substance (e.g., camphor or urea) constitutes the second component, they may be removed thermally to drive off these organic substances, or they may be leached out with a suitable solvent such as ethers or alcohols.

Thus, it is evident from the foregoing description that various means may be used for removing the second components from the metallic matrix. Naturally, other means and leaching agents will suggest themselves to those skilled in the art depending on the natures of the matallic matrix and the second component used to form the electode. It must additionally be noted that the removal of the second component, whether by thermal, chemical or electrochemical means, may be carried out in conventional equipment and the conditions used may be tailored to maximize the effectiveness of this step.

Having removed the second component, the resultant electrode structure will be porous, self-supporting, mechanically strong and structurably integral with electrically continuous metallic (lead, lead alloy, etc.) matrix. The porous electrode must next be treated to form an electrochemically active electrode for its intended use in lead-acid batteries. This may be accomplished by in situ chemical or electrochemical conversion of the metal surfaces of the pores within the lead matrix to electrochemically active materials such as lead oxide, lead dioxide, lead sulfate, or any combination thereof. The in situ conversion of lead surfaces within the pores is effected by exposing the lead surfaces to an oxidizing environment. Regardless of whether a chemical or an electrochemical method is employed, the electrochemically active material which is formed is in intimate contact with the metallic lead surfaces in the pores, thereby assuring electrical continuity between the electrochemically active material, the electrolyte and the external emf source.

Care must be taken to avoid excessive oxidation of the lead surface within the pores. Ideally, the surface oxidation is carried out to form a continuous layer of the electrochemically active material having a thickness of about a few molecular layers to about several microns. As the thickness of this layer increases, so does its internal resistance and, therefore, excessively thick layers of the electrochemically active material are to be avoided.

Exemplary methods of oxidizing the lead surface within the pores to form a layer of electrochemically active material thereon include treatment of the porous electrode with a mixture of hydrogen peroxide and sulfuric acid; or heating the electrode with steam in the presence of sulfuric acid and oxygen; or electrochemical oxidation of the electrode in sulfuric acid with or without chloride ions. These treatments can be carried out individually, sequentially or in combination depending on process economy and the desired electrode properties.

After the formation of the electrochemically active material as aforesaid, the resultant electrode is washed and dried before its assembly into the cells and batteries, as positive electrodes. If the resultant electrodes are to be used as negative electrodes, the electrochemically active materials can be reduced to lead by conventional methods.

Thus, in accordance with the present invention, there is provided, a self-supporting, porous, structurally integral and electrically continuous electrode structure. No grids or supporting plates are used in forming these electrodes; consequently, batteries incorporating such electrodes are considerably lighter in weight than conventional lead-acid batteries. Additionally, batteries incorporating the novel porous electrodes of this invention exhibit lower internal resistance, little or no shedding, high rates of electrical charge and discharge, higher storage capacity and, in general, superior performance characteristics as compared to conventional lead-acid batteries.

While the present invention has been described with some degree of particularity and illustrated with reference to lead as the metallic matrix of the electrode, it can be appreciated by those skilled in art that the teaching herein has a wide application. Accordingly, several changes and modifications are suggested to those skilled in the art which are obvious from the present description and are, therefore, within the scope of this invention.

What is claimed is:

1. A method for forming a porous, self-supporting, structurally integral and electrically continous electrode, which method comprises:
   (a) forming a molten mixture of an electrically conductive metal and a pore forming component wherein said pore forming component is distributed as discrete particulate matter throughout said molten mixture;

(b) cooling and forming said molten mixture into a solid electode structure having predetermined dimensions and configuration, with said pore forming component being distributed throughout the resultant solid metallic electrode;

(c) removing said particulate pore forming component from said solid electrode thereby forming the porous electrode structure, with each pore being defined by walls of said metal, and (d) subjecting said porous electrode structure to an oxidizing environment to form a layer of an electrochemically active material in situ on the walls of said metal within said pores.

2. A method as in claim 1 wherein said metal is lead or lead alloy.

3. A method as in claim 1 wherein said oxidizing environment is hydrogen peroxide in sulfuric acid.

4. A method as in claim 1 wherein said oxidizing environment comprises heating said porous electrode in the presence of steam, oxygen, and sulfuric acid.

5. A method as in claim 1 wherein said oxidizing environment comprises electrochemical anodic oxidation of said porous electrode in the presence of sulfuric acid.

6. A method as in claim 2 wherein said oxidizing environment is hydrogen peroxide in sulfuric, acid.

7. A method as in claim 2 wherein said oxidizing environment comprises heating said porous electrode in the presence of steam, oxygen, and sulfuric acid.

8. A method as in claim 2 wherein said oxidizing environment comprises electrochemical anodic oxidation of said porous electrode in the presence of sulfuric acid.

9. A method for forming a porous, self-supporting, structurally integral and electrically continuous electrode for use in lead-acid storage cells and lead-acid storage batteries, which method conprises:

(a) forming a molten mixture of a metal and a pore form, ing component wherein said pore forming component is distributed as discrete particulate matter throughout said molten mixture, said metal being selected from the group consisting of lead and lead alloys, and said pore forming component being selected from the group consisting of:
1. cadmium, gallium, thallium, zinc, and mixture thereof
2. alkali metal carbonate, alkali metal bicarbonate, lead carbonate, and basic lead carbonate and mixture thereof;
3. camphor, urea, and mixtures thereof; and (b) cooling and forming said molten mixture into a solid electrode structure having predetermined dimensions and configuration, with said pore forming component being distributed throughout the resultant solid metallic electrode;

(c) removing said particulate pore forming component from said solid electrode thereby forming the porous electrode; and (d) subjecting said porous electrode structure to an oxidizing environment to form a layer of an electrochemically active material in situ on the walls of said metal within said pores.

10. A method as in claim 9 wherein said electrochemically active material is lead oxides or lead sulfate.

11. A method as in claim 9 wherein said metal is lead.

12. A method as in claim 11 wherein said electrochemically active material is lead dioxide.

13. A method as in claim 9 wherein said pore forming component is selected from the group consisting of cadmium, gallium, thallium, zinc, and mixtures thereof.

14. A method as in claim 10 wherein said pore forming component is selected from the group consisting of cadmium, gallium, thallium, zinc, and mixtures thereof, 15. A method as in claim 11 wherein said pore forming component is selected from the group consisting of cadmium, gallium, thallium, zinc, and mixtures thereof.

16. A method as in claim 12 wherein said electrochemically active material is selected from the group consisting of cadmium, gallium, thallium, zinc, and mixtures thereof.

17. A method as in claim 9 wherein said metal is lead and said second component is cadmium.

18. A method as in claim 9 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

19. A method as in claim 10 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

20. A method as in claim 11 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

21. A method as in claim 12 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

22. A method as in claim 13 wherein said oxidizing environment is hydrogen peroxide in sulfuric acid, heating said porous electrode in the presence of steam, oxygen, and sulfuric acid or 23. A method as in claim 14 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

24. A method as in claim 15 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

25. A method in claim 16 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

26. A method as in claim 17 wherein said oxidizing environment is hydrogen peroxide in sulfuric acid, heating said porous electrode in the presence of steam, oxygen, and sulfuric acid or electrochemical anodic oxidation of said porous electrode in the presence of sulfuric acid.

* * * * *